United States Patent
Yun et al.

(10) Patent No.: US 10,013,735 B2
(45) Date of Patent: Jul. 3, 2018

(54) GRAPHICS PROCESSING UNIT WITH BAYER MAPPING

(71) Applicant: QUALCOMM Incorporated, San Diego, CA (US)

(72) Inventors: Jay Chunsup Yun, Carlsbad, CA (US); Liang Li, San Diego, CA (US); Vijay Ganugapati, San Jose, CA (US); Xujie Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 14/836,449

(22) Filed: Aug. 26, 2015

(65) Prior Publication Data

US 2016/0217548 A1   Jul. 28, 2016

Related U.S. Application Data

(60) Provisional application No. 62/108,986, filed on Jan. 28, 2015.

(51) Int. Cl.
*G06T 3/40* (2006.01)

(52) U.S. Cl.
CPC .................... *G06T 3/4015* (2013.01)

(58) Field of Classification Search
None
See application file for complete search history.

(56) References Cited

U.S. PATENT DOCUMENTS

| 7,084,881 | B1 | 8/2006 | Chen et al. | |
| 7,330,188 | B1* | 2/2008 | Solanki | G06T 15/04 345/503 |
| 7,986,358 | B1* | 7/2011 | Blais-Morin | G06T 1/00 348/273 |
| 8,452,090 | B1 | 5/2013 | Brunner et al. | |
| 8,643,659 | B1* | 2/2014 | Baldwin | G06T 1/60 345/557 |
| 2004/0189651 | A1* | 9/2004 | F. Zatz | G06T 1/20 345/531 |
| 2005/0129316 | A1 | 6/2005 | Curti et al. | |
| 2009/0251476 | A1* | 10/2009 | Jiao | G06F 9/383 345/543 |
| 2011/0242113 | A1* | 10/2011 | Keall | G06F 9/3857 345/505 |
| 2012/0280973 | A1* | 11/2012 | Nagy | G06T 15/04 345/419 |
| 2013/0044330 | A1* | 2/2013 | Kang | G01B 9/02044 356/479 |

(Continued)

OTHER PUBLICATIONS

MIPI, MIPI Alliance Specification for Camera Serial Interface 2 (CSI-2), 2009, Version 1.01.00 Revision 0.04.*

(Continued)

*Primary Examiner* — Michael J Cobb
(74) *Attorney, Agent, or Firm* — Shumaker & Sieffert, P.A.

(57) ABSTRACT

A method and manufacture for graphics processing in which a first line of raw Bayer data and a second line of raw Bayer data are received. Each two-by-two array of a plurality of non-overlapping two-by-two arrays of the first line of raw Bayer data and the second line of raw Bayer data is mapped as a separate corresponding texel to provide a plurality of texel. At least one operation is performed on at least one of the plurality of texels.

12 Claims, 13 Drawing Sheets

(56) References Cited

U.S. PATENT DOCUMENTS

| | | | | |
|---|---|---|---|---|
| 2013/0080698 A1* | 3/2013 | Raghunathan | .......... | G06F 3/061 711/114 |
| 2013/0169651 A1* | 7/2013 | Minkin | ............ | G06T 1/20 345/501 |
| 2014/0022268 A1* | 1/2014 | Lee | ............ | G06T 1/60 345/522 |
| 2014/0098118 A1* | 4/2014 | Liu | ............ | G06F 9/45529 345/522 |
| 2014/0184632 A1* | 7/2014 | Donovan | ............ | H04N 19/182 345/589 |
| 2014/0218364 A1* | 8/2014 | Collins | ............ | G06T 15/60 345/426 |
| 2014/0244939 A1* | 8/2014 | Kwon | ............ | G06F 12/0855 711/140 |
| 2015/0084975 A1* | 3/2015 | Heinrich | ............ | G06T 1/60 345/552 |
| 2015/0089151 A1* | 3/2015 | Bolz | ............ | G06F 12/0815 711/141 |
| 2015/0097851 A1* | 4/2015 | Anderson | ............ | G06T 1/60 345/552 |

OTHER PUBLICATIONS

Mathworks, "reshape", 2013, retrived from «http://www.mathworks.com:80/help/matlab/ref/reshape.html», accessed Dec. 6, 2017.*

Response to Written Opinion dated May 11, 2016, from International Application No. PCT/US2016/013468, filed on Oct. 26, 2016, 5 pp.

Second Written Opinion from International Application No. PCT/US2016/013468, dated Nov. 29, 2016, 9 pp.

Response to Second Written Opinion dated Nov. 29, 2016. from International Application No. PCT/US2016/013468, filed on Jan. 26, 2017, 5 pp.

International Preliminary Report on Patentability from International Application No. PCT/US2016/013468, dated Mar. 17, 2017, 10 pp.

Chuang et al. "CE1-related: Index map scan for 64×64 palette coding block," JCT-VC Meeting; Geneva, CH (Joint Collaborative Team on Video Coding of ITU-T SG 16 WP 3 and ISO/IEC JTC 1/SC 29/WG 11); Feb. 10-18, 2015, No. JCTVC-T0058, Feb. 12, 2015, 8 pp.

Fortune, "GPU-Based Raw Digital Photo Manipulation," Darwin College Research Report, Jun. 2010, 79 pp.

OpenGL 4 Reference Pages, retrieved on Apr. 20, 2014 from https://www.opengl.org/sdk/docs/man/html/glTexImage2D.xhtml, 10 pp.

Goorts et al., "Raw Camera Image Demosaicing using Finite Impulse Response Filtering on Commodity GPU Hardware using CUDA," SIGMAP and WINSYS 2012, Proceedings of the International Conference on Signal Processing and Multimedia Applications and International Conference on Wireless Information Networks and Systems, Nov. 2012; p. 96-101.

"MIPI Alliance," retrieved on Apr. 27, 2014 from http://mipi.org, 5 pp.

Goorts et al., "Optimal Data Distribution for Versatile Finite Impulse Response Filtering on Next-Generation Graphics Hardware Using CUDA," IEEE Computer Society, Dec. 2009, pp. 300-307.

Langseth et al., "An evaluation of debayering algorithms on GPU for real-time panoramic video recording," 2014 IEEE International Symposium on Multimedia, Dec. 10-12, 2014, pp. 110-115.

McGuire, "Efficient, High Quality Bayer Demosaic Filtering on GPUs," vol. 13, No. 4, Jan. 2008, 16 pp.

Eom et al., "Camera iterface method in mobile handset and Its performance comparison," International Conference on Parallel Processing Workshops, ICPPW 2007, IEEE, Piscataway, NJ, USA, Sep. 2007, pp. 33-39.

International Search Report and Written Opinion from International Application No. PCT/US2016/013468, dated May 11, 2016, 15 pp.

Ryoo et al., "Optimization Principles and Application Performance Evaluation of a Multithreaded GPU Using CUDA," PPOPP '08, Feb. 20-23, 2008, ACM, Salt Lake City, UT, pp. 73-82.

\* cited by examiner

- RAW10 (MIPI10)
  - Packet data size: 4 pixels in 5 bytes
  - Format:

| p3[1:0] | p2[1:0] | p1[1:0] | p0[1:0] | p3[9:2] | p2[9:2] | p1[9:2] | p0[9:2] |
|---|---|---|---|---|---|---|---|
| byte4 | | | | byte3 | byte2 | byte1 | byte0 |

- RAW12 (MIPI12)
  - Packet data size: 2 pixels in 3 bytes
  - Format:

| p1[3:0] | p0[3:0] | p1[11:4] | p0[11:4] |
|---|---|---|---|
| byte3 | | byte1 | byte0 |

- RAW14 (MIPI14)
  - Packet data size: 4 pixels in 7 bytes
  - Format:

| p3[5:0] | p2[5:0] | p1[5:0] | p0[5:0] | p3[13:6] | p2[13:6] | p1[13:6] | p0[13:6] |
|---|---|---|---|---|---|---|---|
| byte6 | byte5 | | byte4 | byte3 | byte2 | byte1 | byte0 |

GRAPHICS PROCESSING UNIT WITH BAYER MAPPING

This application claims the benefit of U.S. Provisional Application No. 62/108,986, filed Jan. 28, 2015, the entire contents of which are hereby incorporated by reference.

TECHNICAL FIELD

This disclosure relates to graphics processing, and in particular to the processing of raw image data by a graphics processing unit (GPU).

BACKGROUND

The output of a CMOS image sensor used by a digital camera is typically Bayer raw data. Bayer raw data is raw image data, without further processing, captured from a Bayer filter that includes a filter pattern that is typically 50% green, 25% red, and 25% blue. Bayer data is "raw" in that the data is in the format provided by the sensor prior to further processing such as demosaicing. An image sensor typically only senses one color in any given location—as described above, a Bayer filter typically uses a filter pattern that is 50% green sensors, 25% red sensors, and 25% blue sensors. Before an image is displayed, it typically undergoes various processing, such as demosaicing, by which the full color image is reconstructed from the image from the sensor that only captures one color in each location.

The Bayer raw image data may also be in a MIPI format, which is a standardized tight packing of raw sensor data in depths of 6-14 bits with no padding until the end of each row (here, "each row" means each row of image data, where the image data is a two-dimensional array that exists in rows and columns). Data in MIPI format is more compact but lacks the padding that is normally used to for the purpose of data structure alignment. "Data structure alignment" refers to the way in which data is accessed and arranged in memory so that it is possible to determine when particular data structures in memory begin and end. Standard data formats use padding to ensure data structure alignment; because data in MIPI format has no padding until the end of each row, the stride length of MIPI format data must be predetermined (e.g., 128 or 256-bit aligned).

SUMMARY

In some examples, a device for graphics processing comprises a cache; and a texture pipeline that is arranged to: receive a first line of raw Bayer data from the cache and a second line of raw Bayer data from the cache; map each two-by-two array of a plurality of non-overlapping two-by-two arrays of the first line of raw Bayer data and the second line of raw Bayer data as a separate corresponding texel to provide a plurality of texels; and perform at least one operation on at least one of the plurality of texels.

In some examples, a method for graphics processing comprises: receiving a first line of raw Bayer data and a second line of raw Bayer data; mapping each two-by-two array of a plurality of non-overlapping two-by-two arrays of the first line of raw Bayer data and the second line of raw Bayer data as a separate corresponding texel to provide a plurality of texels; and performing at least one operation on at least one of the plurality of texels.

In some examples, a device for graphics processing comprises: means for receiving a first line of raw Bayer data and a second line of raw Bayer data; means for mapping each two-by-two array of a plurality of non-overlapping two-by-two arrays of the first line of raw Bayer data and the second line of raw Bayer data as a separate corresponding texel to provide a plurality of texels; and means for performing at least one operation on at least one of the plurality of texels.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 3 is a conceptual diagram showing examples of bit packing in the MIPI10, MIPI12, and MIPI 14 formats.

DETAILED DESCRIPTION

In some examples, a device for graphics processing comprises a cache and a texture pipeline. The texture pipeline (e.g., of a GPU) is arranged to receive a first line of raw Bayer data from the cache and a second line of raw Bayer data from the cache. The texture pipeline is further arranged to map each two-by-two array of a plurality of non-overlapping two-by-two arrays of the first line of raw Bayer data and the second line of raw Bayer data as a separate corresponding texel to provide a plurality of texels. "Two by two" refers to two dimensions of the image data, so that the two-by-two array includes two adjacent pixels in one line (e.g., two adjacent pixels in the first line) and two adjacent pixels in an adjacent line (e.g., two adjacent pixels in the second line). The two-by-two pattern is discussed in greater detail below, for example with respect to FIGS. 9-11 below which illustrate such two-by-two array texels.

Figure 9:
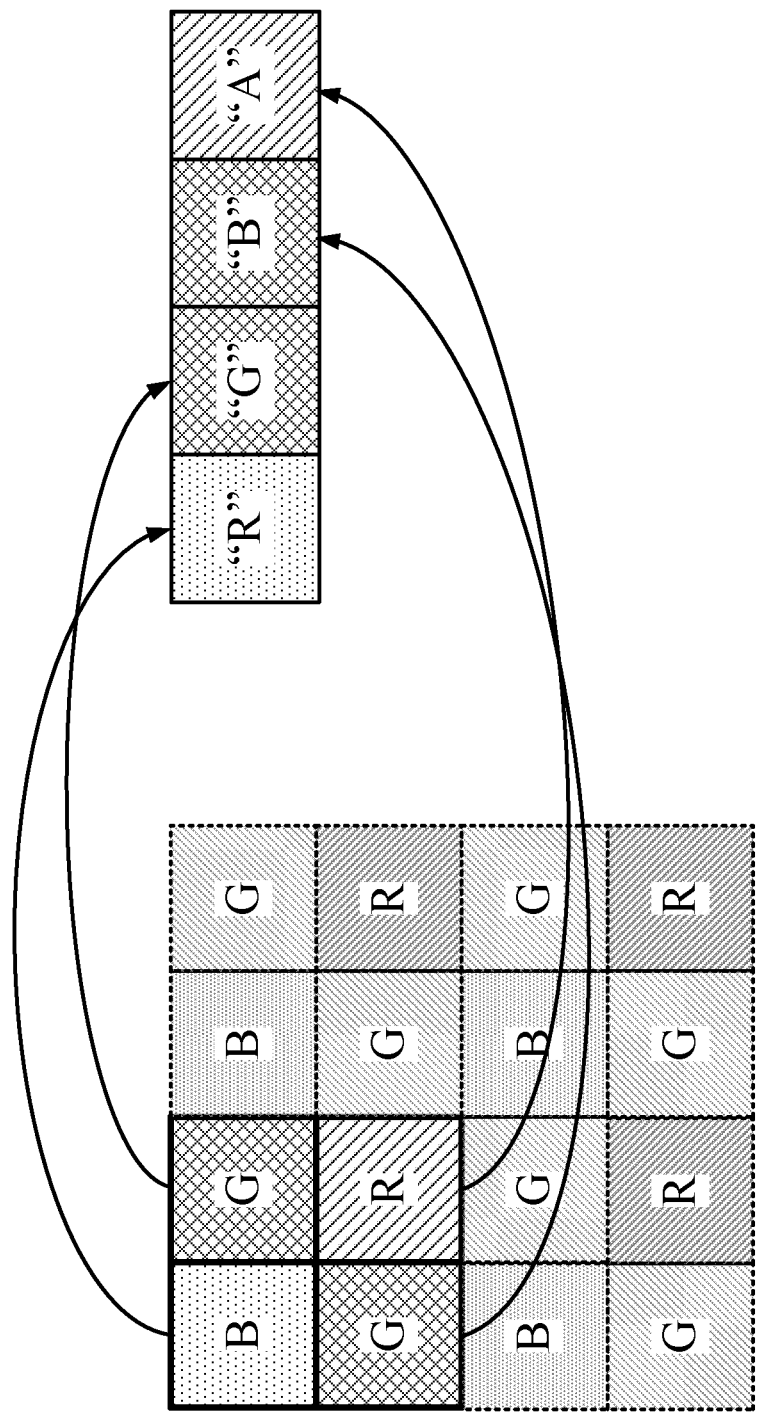
FIG. 9 is a conceptual diagram illustrating an example of mapping each Bayer pattern into a texel in accordance with an example of one of the acts of the process of FIG. 6 in accordance with techniques of this disclosure.

Mapping each two-by-two array of a plurality of non-overlapping two-by-two arrays of the first line of raw Bayer data and the second line of raw Bayer data as a separate corresponding texel means that, after the mapping, the four pixels in each two-by-two array of raw Bayer data are bundled together, so that each bundle of four pixels in the two-by-two matrix is treated as the fundamental unit of operations performed on the data, as opposed to the each individual pixel being treated as the fundamental unit of operations performed on the data. The mapping of each two-by-two array of a plurality of non-overlapping two-by-two arrays of the first line of raw Bayer data and the second line of raw Bayer data as a separate corresponding texel to provide a plurality of texels is by definition referred to as "Bayer swizzling" as a shorter means of referring to the mapping of the two-by-two arrays to the texels. (A specific example of the Bayer swizzle is illustrated in FIG. 9 below and explained in greater detail with respect to FIG. 9.) The texture pipeline is further arranged to perform at least one operation on at least one of the plurality of texels.

The texture pipeline performs the operations in order to accomplish certain pre-processing tasks for certain custom sensor applications, such as, for example, phase detection auto-focus (PDAF) sensors, red-blue-green-clear (RGBC) sensors, interleaved high dynamic range (iHDR) sensors, computational photography, and light field computation, as will be explained in greater detail. The Bayer swizzling allows certain operations performed for such custom sensor applications to be much more efficient, because the operations are performed at the level of texels that each correspond to a two-by-two array of pixels, rather than at the level of individual pixels. Read operations can accomplish in one read what would otherwise require four reads, because after Bayer swizzling, each texel accessed contains four Bayer pixels. For similar reasons, a gathering operation on the texels after Bayer swizzling can accomplish in one load what would otherwise require four loads.

Further, after Bayer swizzling, the texels are well-suited for efficient performance of bilinear filtering in the texture pipeline, for reasons explained in greater detail below (bilinear filtering is explained in subsequent sections herein). In this way, after Bayer swizzling, several applications, including Bayer Binning, can be performed very efficiently in the texture pipeline using the bilinear filtering capability of the texture pipeline. Additionally, the Bayer swizzling bundles Bayer data together so that the load on shader processors in the graphics processing unit (GPU) is reduced, where the texture pipeline and shader processors are both included in the GPU in some examples. Shader processors are discussed in greater detail below. Specific examples of operations that the texture pipeline performs on the texels and greater details of such example operations are described in detail in later sections herein.

The texture pipeline can also be used to unpack raw MIPI data. It may be advantageous for certain custom sensor applications (including, e.g., phase detection auto-focus (PDAF) sensors, red-blue-green-clear (RGBC) sensors, interleaved high dynamic range (iHDR) sensors, computational photography, and light field computation) to have access to MIPI data that is unpacked before performing the operations required by the custom applications. Unpacking the MIPI data in the texture pipeline can have a significant speed advantage over conventional methods of unpacking the MIPI data.

As explained above, MIPI data is tightly-packed—there is no padding in MIPI data until the end of each row. Because MIPI data lacks normal padding, data structure alignment is difficult, and that the stride length of the MIPI data must be predetermined. "Unpacking" MIPI data refers to converting MIPI data into a format with sufficient data structure padding so that the data can be properly alignment with access by a processor without requiring a predetermined stride length. Most standard data formats are "unpacked." It is only tightly-packed data formats such as MIPI (that lack the standard amount of data structure padding) that require unpacking. More details on the MIPI unpacking performed by an example of a texture pipeline in accordance with the disclosure are discussed in later sections herein.

At this stage of the description, it may be helpful to further explain various types of raw data formats, such as Bayer data and MIPI data, so that certain aspects of the disclosure may be better understood.

Figure 1:
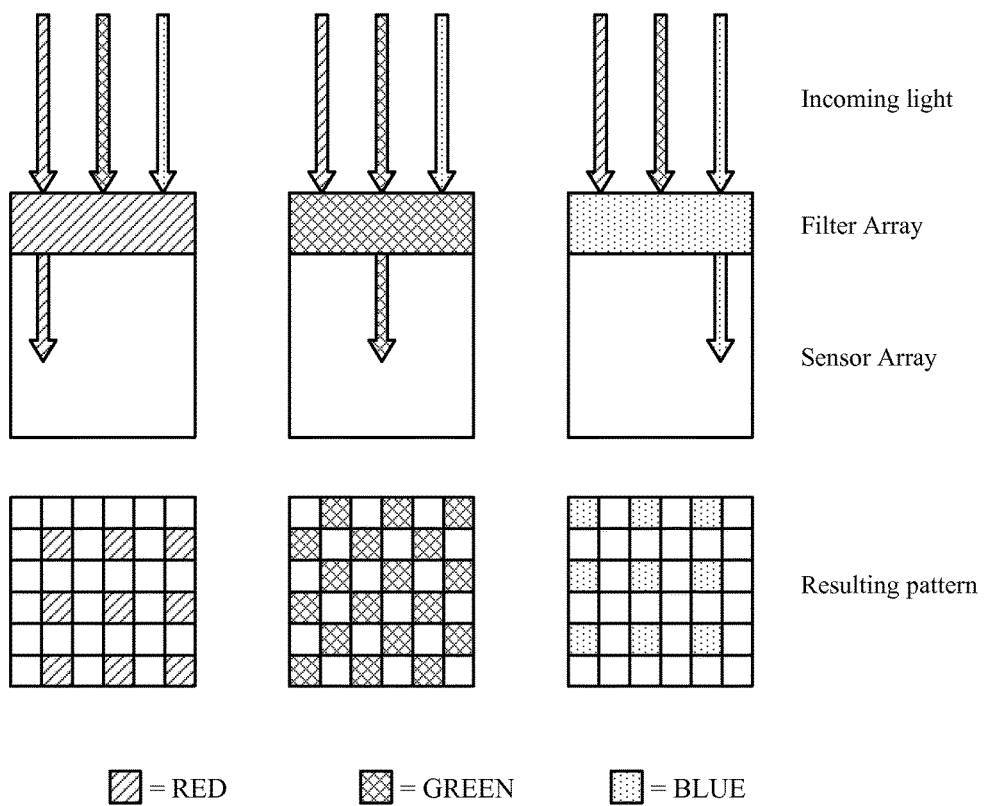
FIG. 1 is a conceptual diagram showing a camera sensor.

The description in this section gives a more detailed explaining of the image data formats (e.g., Bayer and MIPI) discussed herein. A digital camera may include a lens and a camera sensor configured to detect light and generate color pixel values (e.g., RGB values). FIG. 1 shows an example the resultant color pixel values of a camera sensor, where the color pixels values are created by the detection of visible light by the sensor. The resultant color pixel values generated by the sensor are often called raw sensor data. As explained in greater detail below, the raw sensor data is typically in a tightly-packed format, such as a Bayer filter mosaic pixel format, or raw sensor data, including a Bayer filter mosaic pixel format, packed in a MIPI data format (e.g., MIPI10, MIPI12, and MIPI14).

Figure 2:
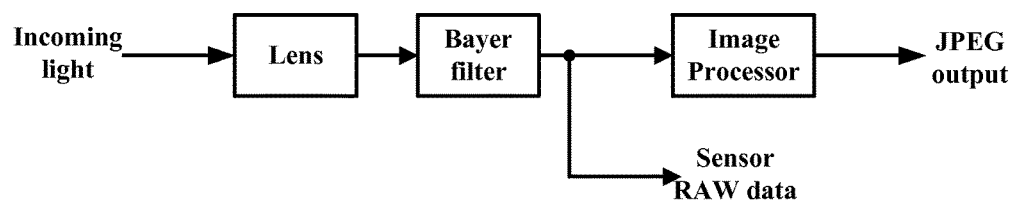
FIG. 2 is a conceptual diagram showing the processing of raw sensor data.

The camera may further include an image signal processor. In some examples, the image signal processor is included together in the same package as the lens and camera sensor. In other examples, the image signal processor may be packaged separately from the lens and camera sensor. In some example, the image signal processor may be included on a system-on-a-chip (SoC) that includes the graphics processing unit (GPU). The image signal processor may be configured to receive the raw sensor data, convert the raw sensor data to a compressed data format (e.g., a JPEG file) and store the resultant compressed data in a picture file. In other examples, the image signal processor may be configured to retain the raw sensor data and save the raw sensor data in a separate file. FIG. 2 shows an example camera system with an image processor.

Often, raw sensor data in a tightly-packed format is unpacked before additional processing is performed (e.g., by an image signal processor). Raw Bayer filter mosaic sensor data is typically 10 or 12-bits per pixel and tightly packed (i.e., packed without any padding until the end of each row).

MIPI data formats are now discussed. The MIPI Alliance is an organization that develops interface specifications for the mobile industry. Example specifications developed by the MIPI Alliance include the Camera Serial Interface (CSI) specification and the Display Serial Interface (DSI) specification. The CSI specification specifies protocols for the interface between a camera sensor and an image signal processor. A commonly-used version of the CSI is CSI-2. The DSI specification specifies protocols for the interface between a display processors and a display panel.

The MIPI format standardizes tight packing of raw sensor data of depths 6-14 bits. MIPI formats for raw sensor data include 10 bit, 12 bit, and 14 bit formats. FIG. 3 shows examples of bit packing in the MIPI10, MIPI12, and MIPI 14 formats. For each of the MIPI formats, each row of pixel data is packed tightly with padding at the end of the row.

One example using a 10 bit format is called the RAW10 format, or MIPI10. As shown in FIG. 3, in MIPI10 format, every 4 pixels (40 bits) are packed into 5 byte chunks. The 8 most significant bits (MSBs) of each pixel are packed first, and then the 2 least significant bits (LSBs) are concatenated into the final byte. The packet data size is 4 pixels in 5 bytes.

One example using a 12 bit format is called the RAW12 format, or MIPI12. As shown in FIG. 3, in MIPI12 format, every 2 pixels (24 bits) are packed into 3 byte chunks. The 8 most significant bits (MSBs) of each pixel are packed first, and then the 4 least significant bits (LSBs) are concatenated into the final byte. The packet data size is 2 pixels in 3 bytes.

One example using a 14 bit format is called the RAW14 format, or MIPI14. As shown in FIG. 3, in MIPI14 format, every 4 pixels (56 bits) are packed into 7 byte chunks. The 8 most significant bits (MSBs) of each pixel are packed first, and then the 6 least significant bits (LSBs) are concatenated into the final byte. The packet data size is 4 pixels in 7 bytes.

Figure 4:
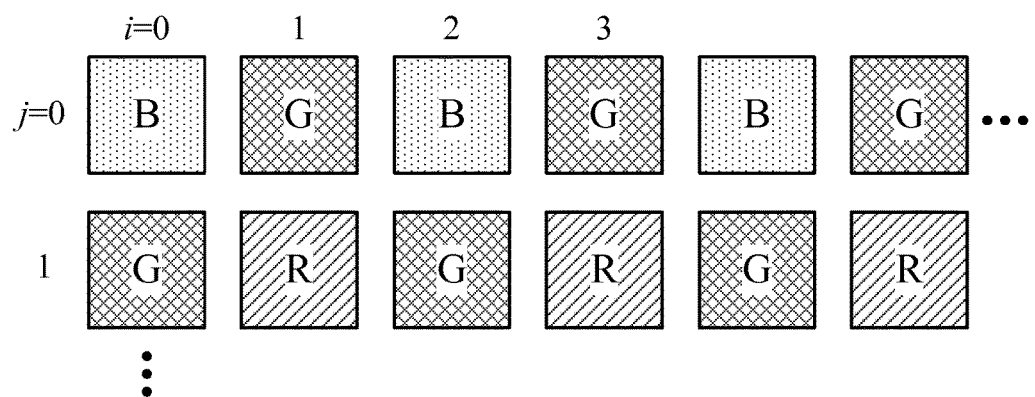
FIG. 4 is a conceptual diagram showing an example layout for Bayer data.

FIG. 4 shows an example layout for a MIPI format. For the MIPI10 format, addressing calculation is performed as follows. Each row or scanline (e.g., "BGBGBG . . . " or "GRGRGR . . . ") is padded at the end. As such, the stride must be predetermined (e.g., 128 or 256-bit aligned). Within each row, for pixel i:

$(i/4)*5$=byte address of 5-byte segment

This calculation may be implemented using an adder and combinatorial logic. However, the complexity of performing the calculation is increased if 2 pixels are needed that cross a 5-byte boundary. In that case, two 5-byte chunks must be fetched.

Now that the relevant image data formats have been discussed, a high-level description of examples of a device and method in accordance with the disclosure are described herein. As the intent of this section is to give a high-level description of the example device and method, examples of specific environments in which the example device and method may be included and further details of specific example elements within device 501 of FIG. 5, as well as benefits achieved by the example device and method, are not discussed in this section, but are instead discussed in other sections of the disclosure herein.

Figure 5:
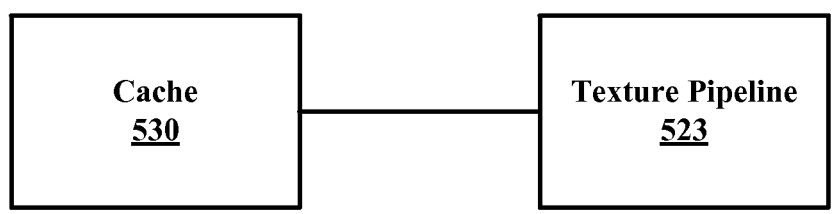
FIG. 5 is a block diagram illustrating an example device in accordance with techniques of this disclosure.

FIG. 5 is a block diagram illustrating an example of a device 501 for graphics processing. Device 501 includes cache 530 and texture pipeline 523. Texture pipeline 523 is arranged to receive a first line of raw Bayer data from cache 530 and a second line of raw Bayer data from cache 530. Texture pipeline 523 is further arranged to map each two-by-two array of a plurality of non-overlapping two-by-two arrays of the first line of raw Bayer data and the second line of raw Bayer data as a separate corresponding texel to provide a plurality of texels. Texture pipeline 523 is further arranged to perform at least one operation on at least one of the plurality of texels.

In some example, texture pipeline 523 is part of a GPU. In some examples, the first and second line of data are adjacent lines of raw image data generated by an image sensor, and the "two-by-two" refers to two dimensions of the image data, so that the two-by-two array includes two adjacent pixels in one line (e.g., two adjacent pixels in the first line) and two adjacent pixels in an adjacent line (e.g., two adjacent pixels in the second line).

Figure 6:
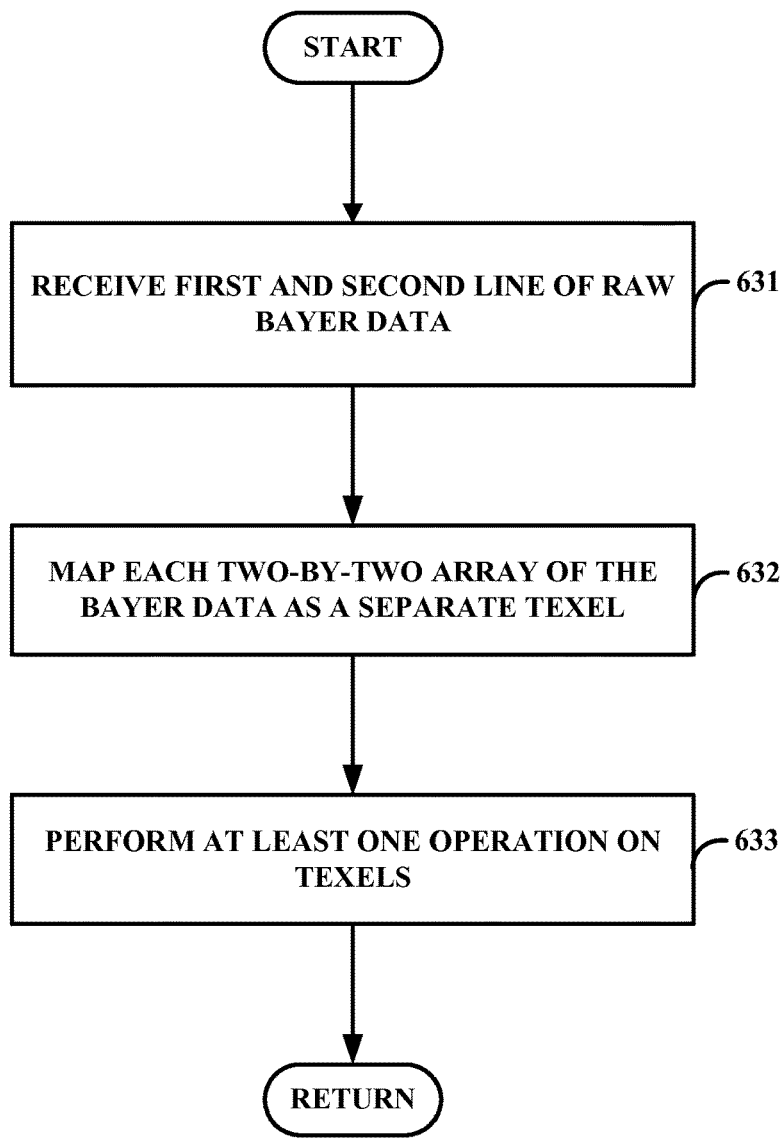
FIG. 6 is a flow diagram illustrating an example process in accordance with techniques of this disclosure.

FIG. 6 is a flow diagram illustrating an example of a process 630 for graphics processing. After a start block, a texture pipeline (e.g., texture pipeline 523 of FIG. 5) receives a first line of raw Bayer data and a second line of raw Bayer data (631). In some examples, the first and second line of data are adjacent lines of raw image data generated by an image sensor. Next, the texture pipeline maps each two-by-two array of a plurality of non-overlapping two-by-two arrays of the first line of raw Bayer data and the second line of raw Bayer data as a separate corresponding texel to provide a plurality of texels (632). The mapping performed by the texture pipeline to map each two-by-two array of a plurality of non-overlapping two-by-two arrays of the first line of raw Bayer data and the second line of raw Bayer data as a separate corresponding texel to provide a plurality of texels is defined herein as "Bayer swizzling". After the Bayer swizzling, the texture pipeline performs at least one operation on at least one of the plurality of texels (633). The process then advances to a return block, where other processing is resumed.

Figure 7:
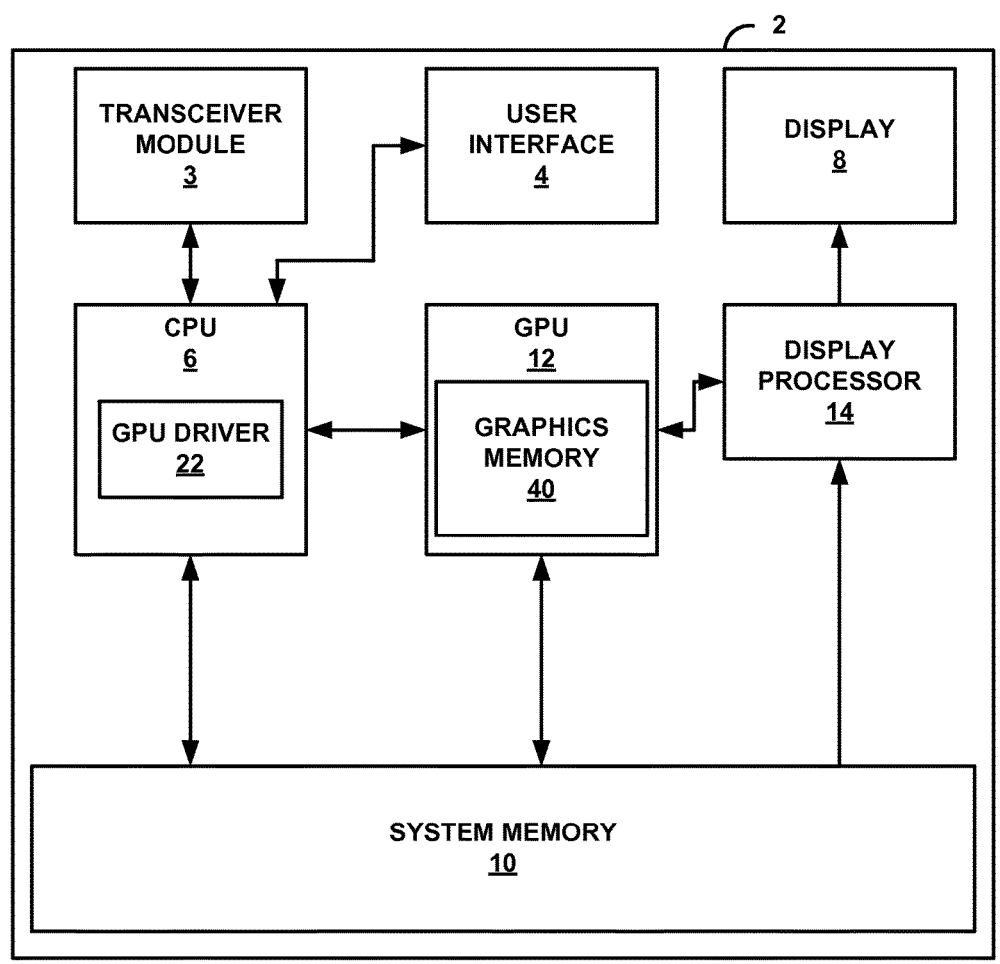
FIG. 7 is a block diagram illustrating an example system that may implement the techniques of this disclosure.

FIG. 7 is a block diagram illustrating an example system/device that may be configured to implement one or more aspects of this disclosure. As shown in FIG. 7, system/device 2 may be a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data. In the example of FIG. 7, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 7 for purposes of clarity. For example, device 2 may include a speaker and a microphone, neither of which are shown in FIG. 7, to effectuate telephonic communications in examples where device 2 is a mobile wireless telephone or a speaker where device 2 is a media player. Device 2 may also include a video camera. Device 2 may also include an image signal processor (ISP). Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of device 2. A user may provide input to device 2 to cause CPU 6 to execute one or more software applications. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to device 2 via one or more input devices (not shown) such as a keyboard, a mouse, a microphone, a touch pad or another input device that is coupled to device 2 via user interface 4.

The software applications that execute on CPU 6 may include one or more graphics rendering instructions that instruct CPU 6 to cause the rendering of graphics data to display 8. In some examples, the software instructions may conform to a graphics application program interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

In other examples, the software instructions that execute on CPU 6 may cause GPU 12 to execute a general purpose shader for performing more general computations applicable to be executed by the highly parallel nature of GPU hardware. Such general-purpose applications may be a so-called general-purpose graphics processing unit (GPGPU) and may conform to a general-purpose API, such as OpenCL.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two dimensional (2D) and/or three dimensional (3D) graphics scenes) onto display 8 more quickly than drawing the scenes directly to display 8 using CPU 6.

GPU 12 may, in some instances, be integrated into a motherboard of device 2. In other instances, GPU 12 may be present on a graphics card that is installed in a port in the motherboard of device 2 or may be otherwise incorporated within a peripheral device configured to interoperate with device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media. Graphics memory 40 may include and/or be coupled to a cache 30. Cache 30 may be employed as an example of cache 530 of FIG. 5. In some examples, cache 30 is a level two cache for memory fetching operations performed by GPU 12 (i.e., a cache miss in GPU 12 may result in an access to cache 30). In other examples, cache 30 may be a level three cache or the like.

In some examples, GPU 12 may store a fully formed image in system memory 10. Display processor 14 may retrieve the image from system memory 10 and output values that cause the pixels of display 8 to illuminate to display the image. Display 8 may be the display of device 2 that displays the image content generated by GPU 12. Display 8 may be a liquid crystal display (LCD), an organic light emitting diode display (OLED), a cathode ray tube (CRT) display, a plasma display, or another type of display device.

In accordance with the techniques of this disclosure, GPU 12 may be arranged to receive raw Bayer data and map each two-by-two array of a plurality of non-overlapping two-by-two arrays of the first line of raw Bayer data and the second line of raw Bayer data as a separate corresponding texel to provide a plurality of texels. Additionally, in accordance with the techniques of this disclosure, GPU 12 may be further configured to unpack camera sensor data when the camera sensor data is in a tightly-packed format such as MIPI.

For example, GPU 12 may include texture pipeline 523, and therefore, may be configured to perform the example techniques described in this disclosure. GPU 12 provides a mechanism for graphics processing, which includes texel processing. Accordingly, GPU 12 may be well-suited for performing the techniques described in this disclosure so that multiple pixels raw Bayer data can be processed as a single fundamental unit (e.g., as a texel for GPU 12). In this way, the ability of GPU 12 to process a texel as a fundamental unit can be exploited to process four different pixels of the Bayer image data.

Figure 8:
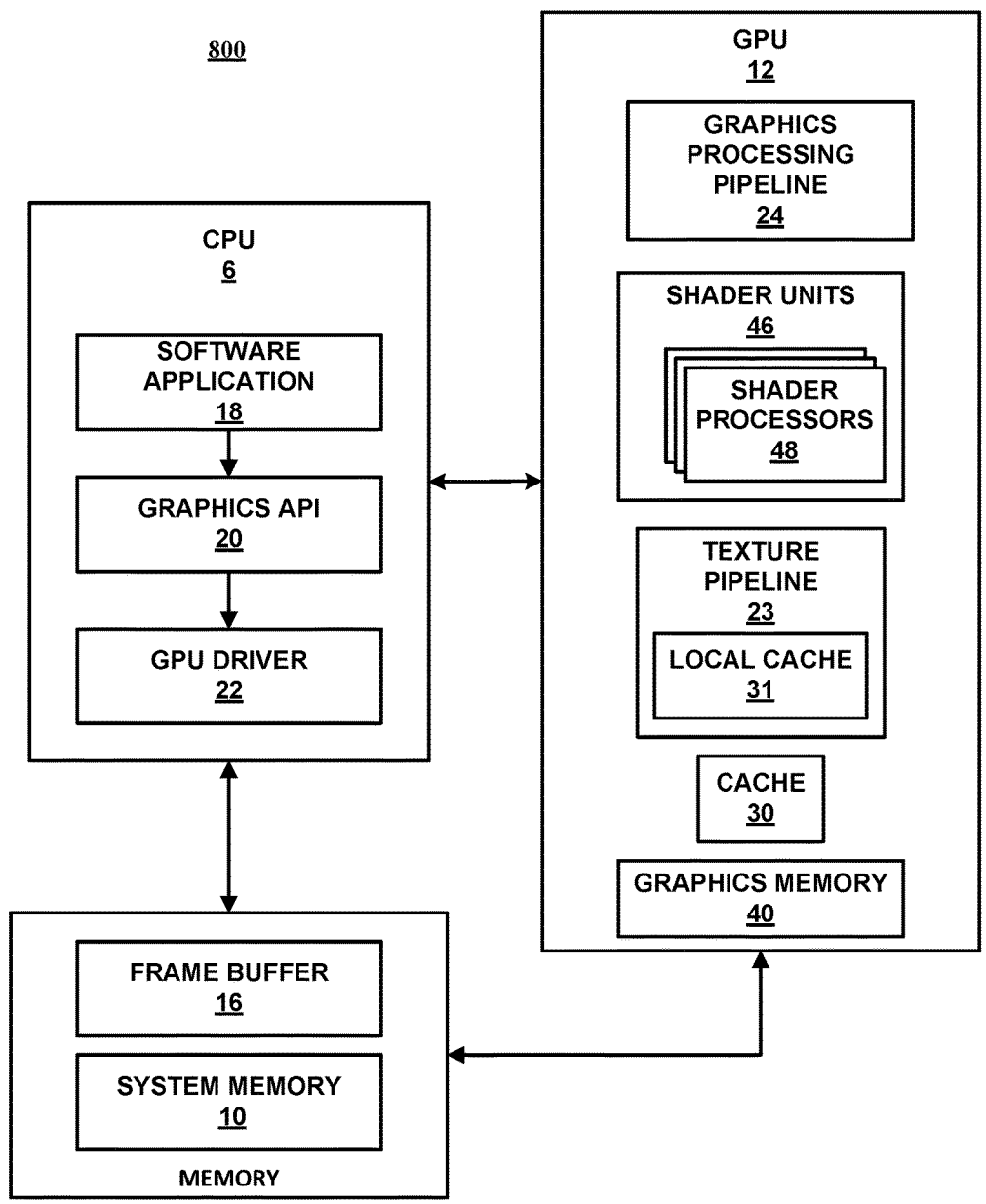
FIG. 8 is a block diagram illustrating an example of the system of FIG. 7 that may implement the techniques of this disclosure.

FIG. 8 is a block diagram illustrating an example of system 800, which includes example implementations of CPU 6, GPU 12, and system memory 10 of FIG. 7 in further detail. As shown in FIG. 8, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10. Frame buffer 16 may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. In some examples, the primitives may be stored in graphics memory 40.

When GPU 12 receives a command from CPU 6, graphics processing pipeline 24 decodes the command and configures graphics processing pipeline 24 to perform the operation specified in the command.

Frame buffer 16 stores destination pixels for GPU 12. Each destination pixel may be associated with a unique screen pixel location. In some examples, frame buffer 16 may store color components and a destination alpha value for each destination pixel.

In some examples, GPU 12 includes shader units 46, graphics processing pipeline 24, texture pipeline 23, and graphics memory 40. In some examples, texture pipeline 23 may be employed as an example of texture pipeline 523 of FIG. 5. One or more shader programs may execute on shader units 46 in GPU 12. Shader units 46 may include shader processors 48, each of which may include one or more components for fetching and decoding operations, one or more arithmetic logic units for carrying out arithmetic calculations, one or more memories, caches, and registers.

GPU 12 may designate shader units 46 to perform a variety of shading operations such as vertex shading, hull shading, domain shading, geometry shading, pixel shading, and the like by sending commands to shader units 46 to execute one or more of a vertex shader stage, a hull shader stage, a domain shader stage, a geometry shader stage, and a pixel shader stage in graphics processing pipeline 24. In some examples, GPU driver 22 may be configured to download shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of shader units 46 within GPU 12. For example, the shader programs may include vertex shader programs that may be executed by shader units 46 to perform the functions of a vertex shader stage, hull shader programs that may be executed by shader units 46 to perform the functions of a hull shader stage, domain shader programs that may be executed by shader units 46 to perform the functions of a domain shader stage, geometry shader programs that may be executed by shader units 46 to perform the functions of a geometry shader stage and/or pixel shader programs that may be executed by shader units 46 to perform the functions of a pixel shader. A vertex shader program may control the execution of a programmable vertex shader unit or a unified shader unit, and include instructions that specify one or more per-vertex operations.

In some examples, raw Bayer image data may be transferred to system memory 10. In some examples, device 800 may be part of, may include, or may be coupled to a digital camera having an image sensor that provides raw Bayer image data, where the raw Bayer image data may be transmitted to system memory 10. In some example, raw Bayer image data in system memory 10 may be transmitted to cache 30 and stored in cache 30.

Texture pipeline 23 is a programmable pipeline of hardware units that perform a texturing function. Texture pipeline 23 is in communication with shader processors 48. In some examples, texture pipeline 23 may include a local cache 31. In some examples, local cache 31 is a level one cache. In this example local cache 31 being a "level one cache" means that local cache 31 is checked first when memory transfer operations are performed, with other location checked only if there is a cache miss in the level one cache.

In some examples, texture pipeline 23 may perform acts, such as the acts of process 630 of FIG. 6. In some examples, texture pipeline 23 may receive a first line of raw Bayer data from cache 30 and a second line of raw Bayer data from cache 30, map each two-by-two array of a plurality of non-overlapping two-by-two arrays of the first line of raw Bayer data and the second line of raw Bayer data as a separate corresponding texel to provide a plurality of texels, and perform at least one operation on at least one of the plurality of texels, in accordance with the process of FIG. 6 in some examples.

For instance, in some examples, texture pipeline 23 reads two lines of raw Bayer image data from cache 30 to access the sets of two-by-two pixels of raw Bayer image data. Next, texture pipeline 23 may map each 2×2 BGGR (Blue Green Green Red) pattern of pixels in the raw data from cache 30 into a single texel of "RGBA" format, for example in the manner illustrated in FIG. 9 (and discussed in greater detail in the immediately proceeding sections in conjunction with FIGS. 9-11). In this way, each 2×2 Bayer pattern is treated as a single "RGBA" color.

FIG. 9 is a conceptual diagram illustrating an example of mapping a Bayer pattern into a texel. In some examples, the input data is raw Bayer MIPI data, and in other examples, the input data is raw Bayer data not in a MIPI format, such as instead being in an eight-bit format or 16-bit format. In some examples, data from the 2×2 Bayer pattern is always mapped in the same manner, such as, in some examples, always mapping the top left as "R," always mapping the top right as "G," and so on as illustrated in FIG. 9.

As shown, in order to perform the Bayer swizzling, the texture pipeline receives two lines of data at a time, so that each two-by-two pattern of pixels can be mapped to a separate texel. In contrast, conventionally, each pixel is a separate texel, so that conventionally only one line of data need be received at a time.

The texture pipeline performs Bayer swizzling for 2×2 arrays because Bayer data is pattered in a two-by-two-array function, such as two green pixels, a red pixel, and one blue pixel per two-by-two array in the typical Bayer format, as shown in the example illustrated in FIG. 9 and also illustrated in FIG. 1, a format known as a 2×2 BGGR (Blue Green Green Red) Bayer pattern. However, other Bayer patterns may be used in accordance with the techniques of this disclosure, including but not limited to RGGB (Red Green Green Blue), GBRG (Green Blue Red Green), GRBG (Green Red Blue Green), RGBC (Red Blue Green Clear), and RGBW (Red Blue Green White). RGBC and RGBW Bayer formats are patterned in two-by-two arrays just as BGGR Bayer patterns are, and so each of these formats benefits from the Bayer swizzling to map each two-by-two array of Bayer pixels into a single texel as discussed herein in accordance with the techniques of this disclosure.

Figure 10:
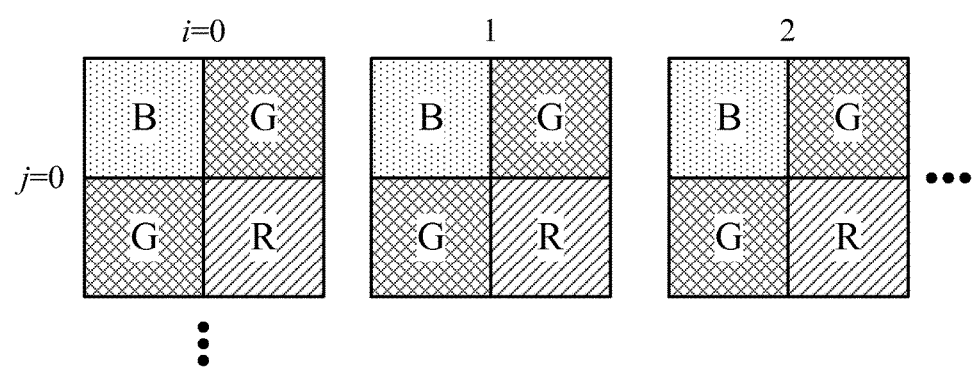
FIG. 10 is a conceptual diagram illustrating a process for addressing the mapped texels of FIG. 9 in accordance with techniques of this disclosure.

FIG. 10 is a conceptual diagram illustrating addressing of the mapped texels of FIG. 9. In some examples, the image co-ordinate (i,j) addressing in this case of Bayer ordering are as shown in FIG. 10. As illustrated, the width and height of the texture of the texels may be half of the standard Bayer texel format. Each texel index includes a 2×2 matrix of four color values.

After mapping the 2×2 Bayer pixels into a corresponding RGBA texel, in some examples, the texture pipeline performs at least one operation on at least one of the texels. The texture pipeline returns a 2×2 matrix of four color values per memory fetch.

As a further example, Bayer Binning may be performed using a bilinear filtering capability of the texture pipeline, wherein the Bayer Binning may include a bilinear filtering operation performed by the texture pipeline. The texture pipeline may also perform operations such as reading on the RGBA texels. In other examples, the texture pipeline may perform Adaptive Bayer Filtering and/or Bayer statistics, where the Adaptive Bayer Filtering and/or Bayer statistics may include a gathering operation such as "Gather4" that may be performed on one or more of the RGBA texels. In some examples, a Gather4 operation may be used to fetch a desired channel in one load rather than four loads. An example such a gathering operation is illustrated in FIG. 11.

Figure 11:
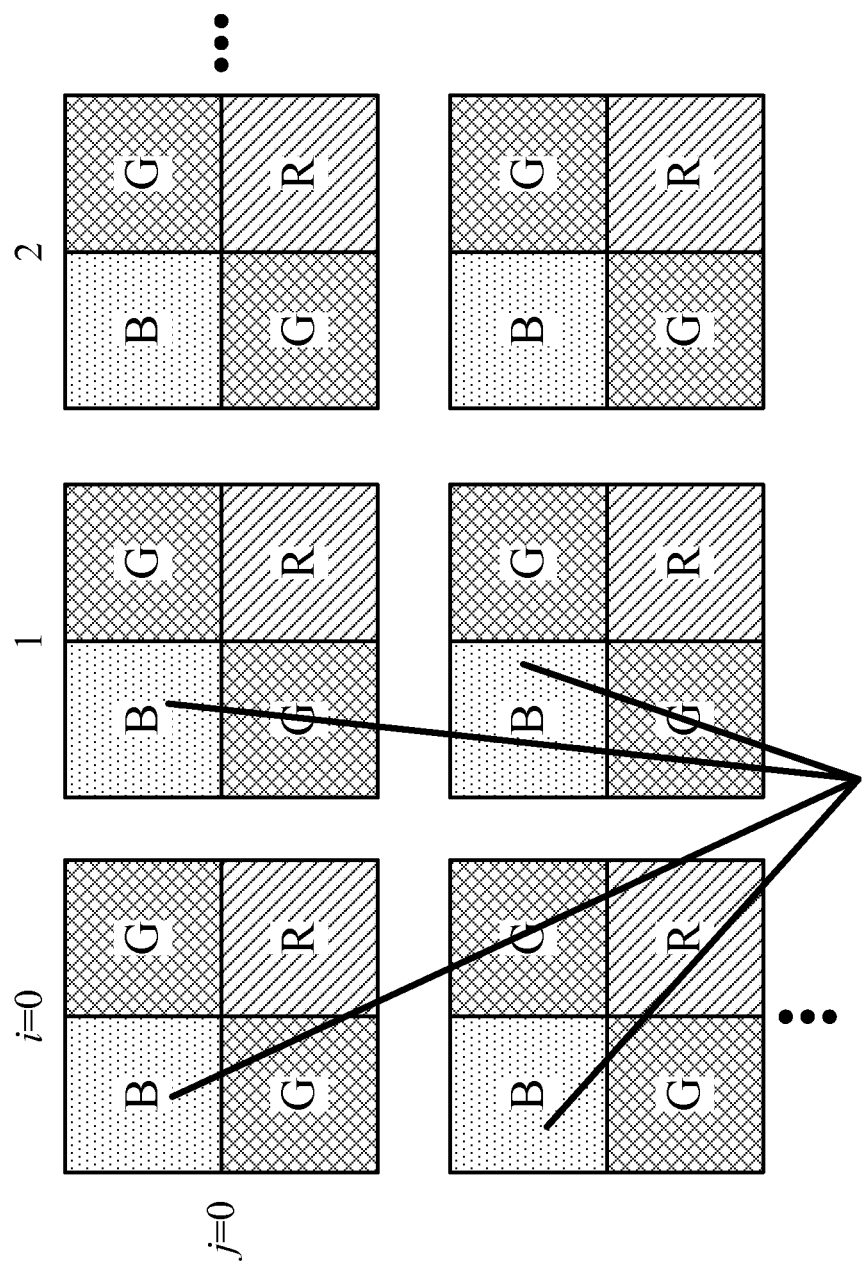
FIG. 11 is a conceptual diagram illustrating an example performing a gather operation on texels in accordance with an example of one of the acts of the process of FIG. 6 in accordance with techniques of this disclosure.

FIG. 11 is a conceptual diagram illustrating an example of the texture pipeline performing a gather operation on texels. FIG. 11 illustrates the effect of an example of the texture pipeline an operation Gather on the "RGBA" texels swizzled from 2×2 Bayer arrays. In particular, FIG. 11 illustrates a gathering operation performed on the B channel. As discussed above, each separate texel is a separate 2×2 Bayer array with each set of address coordinates pointing to entire 2×2 Bayer array texel rather than a single Bayer pixel, so that operations are performed at the level of the texel rather than the level of individual Bayer pixels. As shown in the example illustrated, an example of the gathering operation fetches a single channel of 2×2 Bayer pattern from each of the four neighboring 2×2 Bayer array texels. The texture pipeline may also perform any other function capable of being performed on the Bayer data, including Nearest and Point Sampling among others, may be performed on the 2×2 Bayer arrays in the conventional matter except for the fact that the Bayer data is operated on at the level of 2×2 arrays of pixels rather than at the level of individual pixels, which makes the operations more efficient.

As discussed above and below, bilinear filtering can also be performed on the "RGBA" texels swizzled from 2×2 Bayer arrays. Bilinear filtering is a process by which pixel values are averaged based on neighboring pixel values of the same color. Linear filtering refers to averaging based on neighboring pixels values in the same line (and so either horizontal neighboring pixels or vertical neighboring pixels would be averaged in linear filtering). Bilinear filtering refers to averaging pixel values based on both vertical neighbors and horizontal neighbors. The use of bilinear filtering achieves reduction in visual artifacts by making artifacts less severe by averaging based on neighboring pixels and so reducing the effect of an erroneous pixel having an outlier value.

Bilinear filtering is significantly more efficient with the "RGBA" texels swizzled from 2×2 Bayer arrays because significantly fewer loads are required when averaging neighboring pixels to make use of the texture pipeline's bilinear filtering function.

Figure 12:
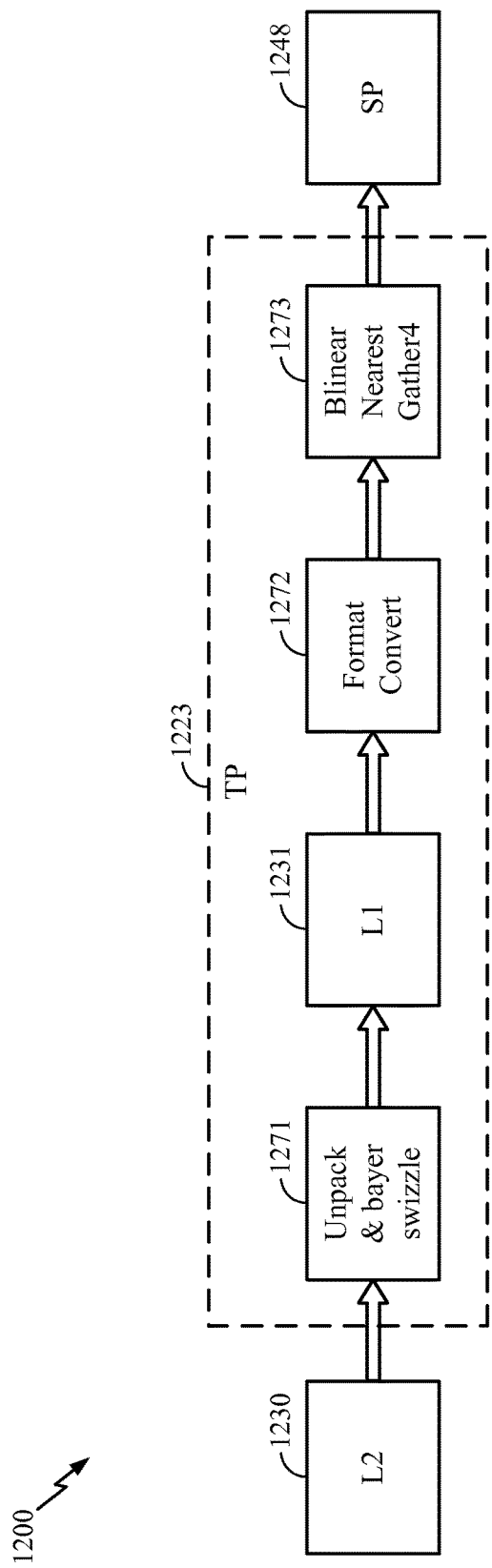
FIG. 12 is a block diagram illustrating an example of a portion of the system of FIG. 8 in accordance with techniques of this disclosure.

FIG. 12 is a functional block diagram illustrating an example device 1200, which may be employed as a portion of system 800 of FIG. 8. Device 1200 includes level 2 cache 1230, texture pipeline 1223 and shader processors 1248, which may be employed as examples of cache 30, pipeline 23, and shader processors 48 respectively, of FIG. 8. Texture pipeline 1223 includes unpack and Bayer swizzle block 1271, level 1 cache 1231, format convert block 1272, and bilinear nearest gather4 block 1273. Cache 1231 may be employed as an example of cache 31 of FIG. 8. As shown in FIG. 12, unpack and Bayer swizzle block 1271, level 1 cache 1231, format convert block 1272, and bilinear nearest gather4 block 1273 all reside in texture pipeline 1223.

In some examples, block 1271 includes hardware that is arranged to recognize whether or not image data provided to block 1271 is MIPI data (i.e., to make a determination as to whether the image data is in a MIPI format), and if the image data is MIPI raw data, to unpack the MIPI raw data via hardware in block 1271. Block 1271 may be an unpacking circuit that includes hardware. Some examples of device 1200 are used in conjunction with a camera that is capable of sending raw Bayer data as either MIPI-packed Bayer data or unpacked Bayer images, and so device 1200 supports both MIPI-packed Bayer data and unpacked Bayer data efficiently. In some examples, both normalized and integer data types are supported by block 1271. In some examples, block 1271 unpacks the MIPI raw data into a 16-bit data format (i.e., 16 bits per pixel). In this way, raw Bayer MIPI data is unpacked to 64 bits per texel (four 16-bit pixels) after block 1271 performs unpacking and Bayer swizzling. In other examples, block 1271 may unpack the MIPI raw data into a suitable format other than a 16-bit format.

In some examples, texture pipeline 1223 makes use of what are called "texture data types," or simply "texture types," to identify different types of texture for different types of processing, and assign various textures the appropriate texture type in accordance with the texture, and subsequently performs graphic processing functions based on the identified texture data type. However, in some examples, functionality performed by hardware in texture pipeline 1223 may be accessed by assigning texture data types to data that do not actually represent texture, so that hardware in texture pipeline 1223 can perform functions on the data based on the assigned texture data type. In some examples, new texture data types are assigned for texture pipeline 1223 to perform processing on raw image data. For instance, in some examples, MIPI raw data is one (or more) separate texture data type(s). Texture pipeline 1223 is configured to provide read access as texture for all data formats.

In some examples, block 1271 includes a built-in cache within block 1271. In some examples, responses from level 2 cache 1230 are stored in the built-in cache of block 1271 for future level 1 cache misses. In some examples, a cache miss in the level 1 cache 1231 will first check the built-in cache in block 1271 using the address as a tag. In this way, in some examples, the built-in cache of block 1271 effectively operates as a level 1.5 cache because it is an intermediary between the level 1 caching and level 2 caching. The use of the cache in 1271 increases efficiency because the level 2 cache 1230 includes unpacked MIPI data in some examples. If the level 1.5 cache in block 1271 is not used, then on a cache miss of the level 1 local cache 1231, multiple accesses to a cacheline in level two cache 1230 may be required because the data in level two cache 1230 is in a tightly-packed format and therefore unaligned. By using the level 1.5 cache in block 1271, where the data in the level 1.5 cache of block 1271 is unpacked, the number of fetches to the unaligned data in level two cache 1230 is reduced. Also, conventionally, level two cache 1230 would handle requests for splitting (e.g., requests to align unaligned data). However, because block 1271 performs unpacking, level two cache 1230 need not handle requests for splitting, which increases the efficiency of level two cache 1230.

It is possible to use graphics memory 40 (of FIG. 8) to unpack the raw MIPI data, but this requires additional synchronization because the MIPI data is tightly-packed and therefore unaligned. MIPI unpacking performed by texture pipeline 1223 with level 1 cache 1231 holding unpacked pixels allows sharing the unpacked pixels of the raw MIPI image data across multiple work-items in texture pipeline 1223 without requiring synchronization with graphics memory 40 (of FIG. 8) to ensure the data is available. Receiving data specifically from level 1 cache 1231 allows holding unpacked pixels for access by multiple work-items in texture pipeline 1223 so that processing on the raw image data can occur in parallel, which allows for increased efficiency. Also, the hierarchical cache structure discussed above allows for increased efficiency for the reasons stated above.

In some examples, format convert block 1272 converts the data into FP (floating point) format. Block 1273 may perform various functions on texels such as Bilinear, Nearest, point sampling, and Gather4 functions, as discussed above in the discussion regarding FIG. 11.

In various examples, texture pipeline 1223 may use Texture Gather operations on the mapped Bayer RGBA texels to fetch B-only, G-only, and R-only pixels. Additional, texture pipeline 1223 may apply bilinear filtering may be applied to B, G, and R channels separately.

As discussed above, due to the Bayer swizzling, a single operation may effectively allow operations to be performed (by texture pipeline 1223) on four Bayer pixels at a time. For example, a read operation on the RGBA texels after the Bayer swizzle effectively reads four Bayer pixels at a time rather than one Bayer pixel at a time, a Gather4 operation may be used to fetch a desired channel in one load rather than four loads, and so forth.

In some examples, device 1200 provides an API (for example, via a framework extension) by which it is possible to perform various functions of block 1271 including unpacking functions performed by block 1271 and Bayer 2×2 pixel to RGBA texel mapping (i.e., Bayer swizzling), via an API, so that the various functions are accessible via the API. Accordingly, in some examples, block 1271 may perform unpacking responsive to an API rather than via a texture type. In some examples, the API may be used in place of a texture type, whereas in other examples, both a texture type and an API extension may be used, with the API extension including the texture data. In other examples, texture pipeline 1223 uses texture data types for the unpacking function and the Bayer swizzle function. In some examples, the API may be used in place of a texture type, whereas in other examples, both a texture type and an API extension may be used, with the API extension including the texture data. Other examples may use a texture type but not an API. In some examples, shader processor 1248 may fetch the texels to perform demosaicing operations.

In some examples, shader processor 1248 may subsequently transmit image data to an image signal processor (ISP) (not shown) for further processing. Various functions performed by hardware in texture pipeline 1223, including MIPI unpacking and Bayer swizzling, and various operations performed on the unpacked "RGBA" texels (including gathering functions and bilinear filtering, among others), may serve as image pre-processing that is performed prior to the image signal processing performed by the ISP. The pre-processing performed by hardware in texture pipeline 1223 as described herein may be particularly useful in conjunction with PDAF (phase detection auto-focus), RGBC (Red Green Blue Clear), interleaved high dynamic range (iHDR), computational photography, and light-field computation, among other things, because these applications use or benefit from MIPI unpacking and/or bilinear filter and therefore benefit from more efficient MIPI unpacking and/or more efficient bilinear filtering. Various functions performed by hardware in texture pipeline 1223 can also be done as post-processing. That is, after functions performed the ISP, the image data can be sent to texture pipeline 1223 for the performance of various operations discussed above.

Figure 13:
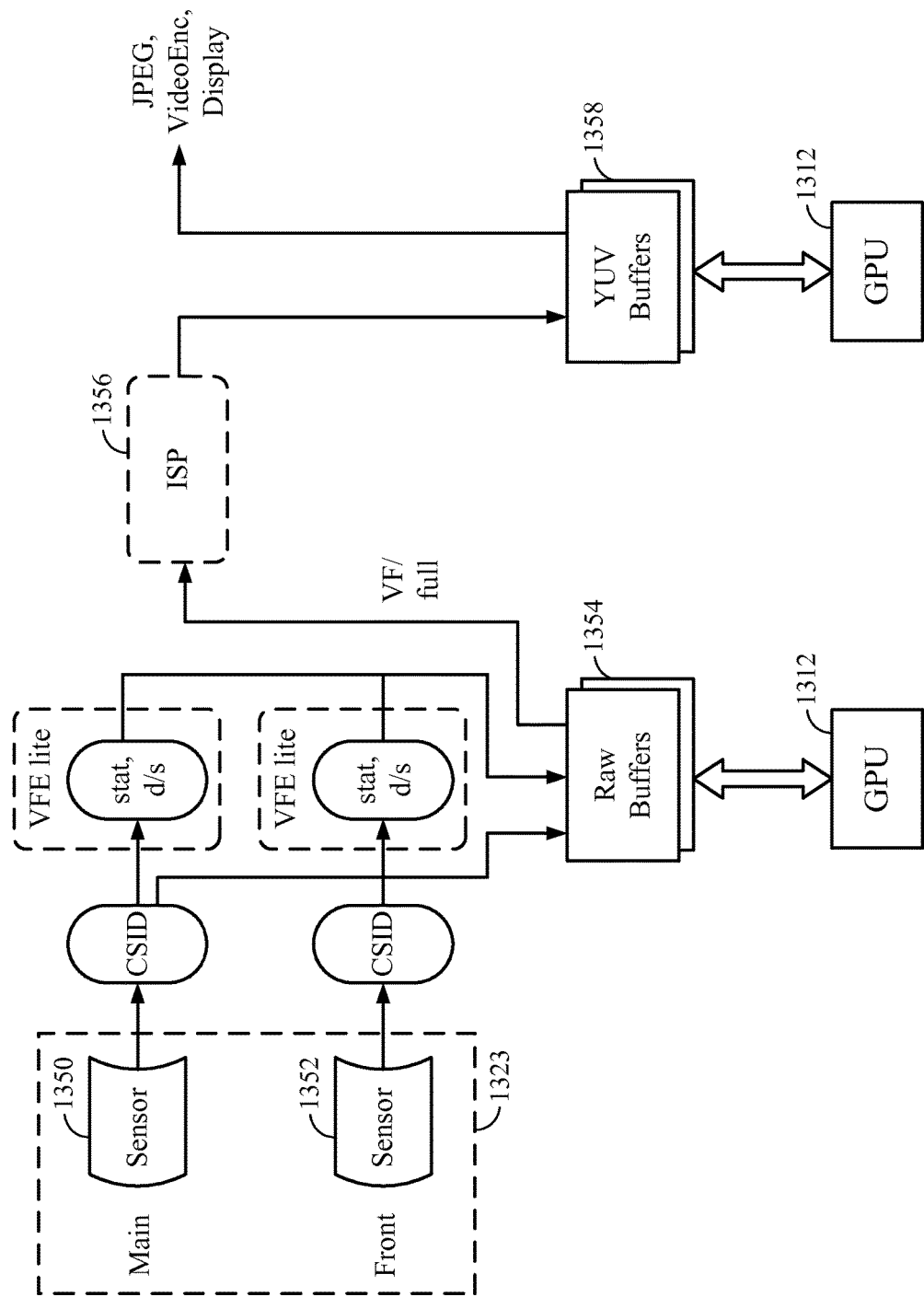
FIG. 13 is a function block diagram showing an example of the device of FIG. 7, in accordance with the techniques of this disclosure.

FIG. 13 is a functional block diagram showing an example of functional aspects of an example device 1302, which may be employed as an example of a portion of device 2 of FIG. 7, and a camera 1323, in more detail. GPU 1312 may be employed as an example of GPU 12 of FIG. 7. In some examples, raw buffers 1354 and YUV buffers 1358 are each an example of a portion of system memory 10 of FIG. 8. FIG. 13 is a functional block diagram that shows an example functional process flow rather than accurate structure—for example, GPU 1312 is shown twice in FIG. 13—not because there are two GPUs, but because, in the specific example illustrated, FIG. 13 is a functional block diagram and the same GPU 1312 performs functions at two distinct points in the functional process flow.

Camera 1323 may include one or more camera sensors include a main sensor 1350 and a front sensor 1352 (e.g., as arranged on contemporary smartphones). Raw sensor data generated by sensor 1350 and/or sensor 1352 (e.g., in a MIPI10 Bayer pattern format) may be stored in raw buffers 1354. The raw sensor data may be routed to raw buffers 1354 by one or more camera serial interface (CSI) decoders CSID. The CSI decoders CSID may incorporate a statistics and downscaler unit. In accordance with the techniques of this disclosure, GPU 1312, using texture pipeline in GPU 1312, may be configured to unpack and/or filter the raw sensor data and store the unpacked data back into raw buffers 1354. The unpacked data may then be used by image signal processor 1356 to generate an image file in a compressed format (e.g., JPEG). The compressed camera data may then be stored in YUV buffers 1358. Such data may then be further manipulated by GPU 1312, display processor 23 of FIG. 7, or CPU 6 of FIG. 7, and/or displayed on display 18 of FIG. 7 (As discussed above, the device of FIG. 13 may be employed as a portion of device 2 of FIG. 13).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which does not include propagating signal per se or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or the like, but are instead directed to tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for graphics processing, comprising:
   receiving raw Bayer data packed in a MIPI format from a first cache in a graphics processing unit (GPU), the raw Bayer data including a first line of raw Bayer data and a second line of raw Bayer data, wherein in the MIPI format, there is no padding between pixels of the raw Bayer data until an end of a line of raw Bayer data;
   unpacking the raw Bayer data packed in the MIPI format using texture pipeline hardware of the GPU such that padding is included in the raw Bayer data;
   storing responses from the first cache in a second cache in the GPU, wherein a cache miss of the second cache results in a check of the first cache;
   storing the unpacked raw Bayer data in a third cache in the GPU, wherein a cache miss of the third cache results in a check of the second cache;
   after unpacking the raw Bayer data, forming, by the texture pipeline hardware, a plurality of texels, wherein:
      a fundamental unit of operation performed in the texture pipeline hardware is a texel, and
      forming the plurality of texels comprises:
         checking the third cache for the unpacked raw Bayer data; and
         forming the plurality of texels such that each respective texel of the plurality of texels comprises pixels of a different two-by-two array of a plurality of non-overlapping two-by-two arrays of pixels in the first line of raw Bayer data and the second line of raw Bayer data such that each respective texel of the plurality of texels includes two pixels of the first line of raw Bayer data and two pixels of the second line of raw Bayer data immediately below the two pixels of the first line of raw Bayer data, and
      each respective texel of the plurality of texels includes two green pixels, one blue pixel, and one red pixel; and
   performing, by the texture pipeline hardware, at least one texel-level operation on a particular texel in the plurality of texels.

2. The method of claim 1, wherein performing the at least one texel-level operation includes performing, by the texture pipeline hardware, at least one of a Bayer binning operation on the particular texel, a bilinear filter operation that applies a bilinear filter to the particular texel, a reading operation that reads four Bayer pixels of the particular texel at a time, or a gathering operation that gathers in one call a channel from the plurality of texels.

3. The method of claim 1, wherein each texel of the plurality of texels is in an RGBA format.

4. The method of claim 1, further comprising, after performing the at least one texel-level operation on at least one of the plurality of texels, transmitting, by the texture pipeline hardware, the plurality of texels to an image signal processor.

5. The method of claim 1, wherein a function for forming the plurality of texels is included in an application program interface.

6. The method of claim 1, wherein a function for unpacking of the raw Bayer data is included in an application program interface.

7. A device for graphics processing, the device comprising:
a graphics processing unit comprising:
a first cache; and
texture pipeline hardware that includes a second cache and a third cache, wherein the texture pipeline hardware is arranged to:
receive raw Bayer data in a MIPI format from the first cache, the raw Bayer data including a first line of raw Bayer data from the first cache and a second line of raw Bayer data from the first cache, wherein in the MIPI format, there is no padding between pixels of the raw Bayer data until an end of a line of raw Bayer data;
unpack the raw Bayer data packed in the MIPI format such that padding is included in the raw Bayer data;
store responses from the first cache in a second cache in the GPU, wherein a cache miss of the second cache results in a check of the first cache:
store the unpacked raw Bayer data in a third cache in the GPU, wherein a cache miss of the third cache results in a check of the second cache;
after unpacking the raw Bayer data, form a plurality of texels, wherein:
a fundamental unit of operation performed in the texture pipeline hardware is a texel, and
as part of forming the plurality of texels:
check the third cache for the unpacked raw Bayer data; and
form the plurality of texels such that each respective texel of the plurality of texels comprises pixels of a different two-by-two array of a plurality of non-overlapping two-by-two arrays of pixels in the first line of raw Bayer data and the second line of raw Bayer data such that each respective texel of the plurality of texels includes two pixels of the first line of raw Bayer data and two pixels of the second line of raw Bayer data immediately below the two pixels of the first line of raw Bayer data, and
each respective texel of the plurality of texels includes two green pixels, one blue pixel, and one red pixel; and
perform at least one texel-level operation on a particular texel in the plurality of texels.

8. The device of claim 7, wherein the texture pipeline hardware is arranged such that the at least one texel-level operation includes at least one of a Bayer binning operation on the particular texel, a bilinear filter operation that applies a bilinear filter to the particular texel, a reading operation that reads four Bayer pixels of the particular texel at a time, or a gathering operation that gathers in one call a channel from the plurality of texels.

9. The device of claim 7, wherein the texture pipeline hardware is arranged such that each texel of the plurality of texels is in an RGBA format.

10. The device of claim 7, further comprising an image signal processor, wherein the image signal processor is arranged to receive the plurality of texels after texture pipeline hardware performs the at least one texel-level operation on the particular texel in the plurality of texels.

11. The device of claim 7, wherein a function for forming the plurality of texels is included in an application program interface.

12. The device of claim 7, wherein a function for unpacking of the raw Bayer data is included in an application program interface.

* * * * *